(12) United States Patent
Cunningham (10) Patent No.: US 9,465,866 B2
(45) Date of Patent: Oct. 11, 2016

(54) TASK CONTEXT RECOVERY

(75) Inventor: Ger Cunningham, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 13/156,434

(22) Filed: Jun. 9, 2011

(65) Prior Publication Data

US 2012/0317133 A1    Dec. 13, 2012

(51) Int. Cl.
   *G06F 17/30*    (2006.01)
(52) U.S. Cl.
   CPC ....... *G06F 17/30722* (2013.01); *G06F 17/301* (2013.01); *G06F 17/30997* (2013.01)
(58) Field of Classification Search
   CPC ........... G06F 17/301; G06F 17/30722; G06F 17/3099
   USPC ......................................................... 707/769
   See application file for complete search history.

(56) References Cited

U.S. PATENT DOCUMENTS

| | | |
|---|---|---|
| 5,692,143 A | 11/1997 | Johnson et al. |
| 6,674,447 B1 * | 1/2004 | Chiang et al. ............. 715/704 |
| 2002/0032677 A1 * | 3/2002 | Morgenthaler et al. .......... 707/3 |
| 2002/0063715 A1 | 5/2002 | Foran |
| 2005/0060719 A1 | 3/2005 | Gray et al. |
| 2005/0234848 A1 * | 10/2005 | Lawrence et al. ................ 707/1 |
| 2007/0106810 A1 | 5/2007 | Ryman |
| 2008/0147453 A1 | 6/2008 | Kogan et al. |
| 2008/0168050 A1 * | 7/2008 | Reyes et al. ..................... 707/5 |
| 2008/0282160 A1 | 11/2008 | Tonnison et al. |
| 2009/0063422 A1 * | 3/2009 | Kodama ........... G06F 17/30386 |
| 2010/0095208 A1 * | 4/2010 | White et al. .................. 715/704 |
| 2010/0229112 A1 * | 9/2010 | Ergan .................. G06F 3/04895 715/764 |
| 2011/0202847 A1 * | 8/2011 | Dimitrov ...................... 715/738 |
| 2012/0166952 A1 * | 6/2012 | Alexandrov et al. ......... 715/730 |

FOREIGN PATENT DOCUMENTS

EP    0236746    5/1993

* cited by examiner

*Primary Examiner* — Shew-Fen Lin
(74) *Attorney, Agent, or Firm* — Kunzler Law Group (57) ABSTRACT

A data store stores display content indexed to a word segment. The display content comprises a time stamp and a screen shot captured in response to entering the word segment using an input. A process module searches the data store for the word segment, presents the display content indexed to the word segment, and replays an action for the display content.

8 Claims, 7 Drawing Sheets

TASK CONTEXT RECOVERY

BACKGROUND

1. Field

The subject matter disclosed herein relates to task context and more particularly relates to recovering the context of a task.

2. Description of the Related Art

Tasks such as drafting a document, building a spreadsheet, writing software code, or creating an engineering design are often performed in multiple sessions with significant time intervals between sessions. For example, a user may begin drafting a document and then return to complete the document months later.

As a result, the user may have trouble remembering the specific file that was worked on in the previous session. In addition, the user may have difficulty remembering the last elements being addressed and/or the context of the previous session.

BRIEF SUMMARY

From the foregoing discussion, it should be apparent that a need exists for a method and apparatus that stores and/or recovers a context of a task. Beneficially, such a method and apparatus would aid a user in locating a task file and remembering the context of the work performed on the file.

The present invention has been developed in response to the present state of the art, and in particular, in response to the problems and needs in the art that have not yet been fully solved by currently available task context recovery methods. Accordingly, the present invention has been developed to provide a method and apparatus for task context recovery that overcome many or all of the above-discussed shortcomings in the art.

A method is presented for task context recovery. The method comprises searching a data store for a word segment. The method further comprises presenting display content indexed to the word segment. The display content is stored in the data store and comprises a time stamp and a screen shot captured in response to entering the word segment using an input. In addition, the method comprises replaying an action for the display content.

The apparatus for task context recovery is provided with a plurality of modules configured to functionally perform the method. These modules in the described embodiments include a computer readable storage medium, a data store, and a process module.

The computer readable storage medium stores computer readable program code executable by a processor. The data store stores display content indexed to a word segment. The display content comprises a time stamp and a screen shot captured in response to entering the word segment using an input. The process module searches the data store for the word segment, presents the display content indexed to the word segment, and replays an action for the display content.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In another embodiment, the service provider requests payment directly from a customer account at a banking or financial institution. In a certain embodiment, if the service provider is also a customer of the customer that uses the computer program product, the payment owed to the service provider is reconciled to the payment owed by the service provider to minimize the transfer of payments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which executed via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
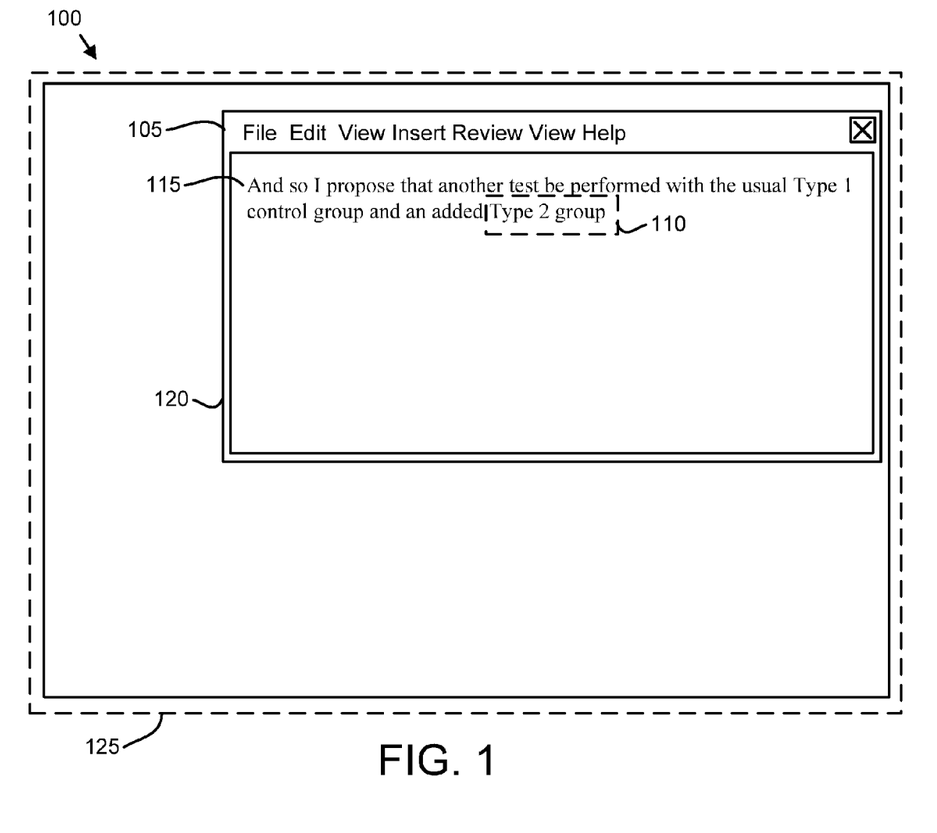
FIG. 1 is a drawing illustrating one embodiment of an application window on a computer screen.

FIG. 1 is a drawing illustrating one embodiment of a document on a computer screen 100. The computer screen 100 displays an application window 120. In the depicted embodiment, the application window 120 is a word processing application. The application window 120 may also be a spreadsheet application, a database application, a Web browser application, a software authoring system application, a design application, a video editing application, an audio editing application, an accounting application, or the like. The application window 120 includes a toolbar 105 with a plurality of controls.

In one embodiment, text 115 is entered into the application window 120 using an input. The input may be a keyboard, a virtual keyboard, a pointing device such as a mouse selecting a character and/or a word, a speech recognition application, a touchscreen, an eye tracking device, or the like.

In an exemplary embodiment, the input renders the word segment 110 "Type 2 group" in the application window 120. Although depicted as a phrase, the word segment 110 may be a single character, a partial word, a word, a phrase, a paragraph, or the like. In one embodiment, the word segment 110 is a collection of significant words parsed from the text 115. For example, the word segment 110 may include keywords that are not contiguous in the text 115 such as the exemplary word segment 110 "test, type 1 control group, type 2 group." The exemplary word segment 110 includes non-contiguous word and phrases from the text 115 that may be selected for significance.

In one embodiment, the word segment 110 comprises all characters that are entered within a specified input interval. The word segment 110 may be selected from the latest characters, words, and/or phrases received from the input. For example, FIG. 1 depicts the word segment 110 as "Type 2 group." Alternatively, the word segment 110 may be the character "p" or the word "group."

Alternatively, the word segment 110 may be words with high relevancy values. For example, the word "control" may have a higher relevancy value then the word "and." In one embodiment, words with relevancy values that exceed a relevancy threshold and that are entered within the specified input interval may be selected for the word segment 110.

In one embodiment, the specified input interval is a time interval. The input interval may be in the range of 30 to 300 seconds. Alternatively, the input interval may be a word count. In a certain embodiment, the input interval may be in the range of 15 to 120 words.

In one embodiment, a screenshot 125 is captured of the computer screen 100. The screenshot 125 may be stored as a Motion Picture Experts Group (MPEG)-1 file, an MPEG-2 file, an MPEG-3 file, an MPEG-4 file, an MPEG-7 file, an MPEG-21 file, Portable Network Graphics (PNG) file, a Joint Photographic Experts Group (JPEG) file, a Graphics Interchange Format (GIF) file, or the like. In one embodiment, a time stamp is recorded when the screenshot 125 is captured.

Figure 2:
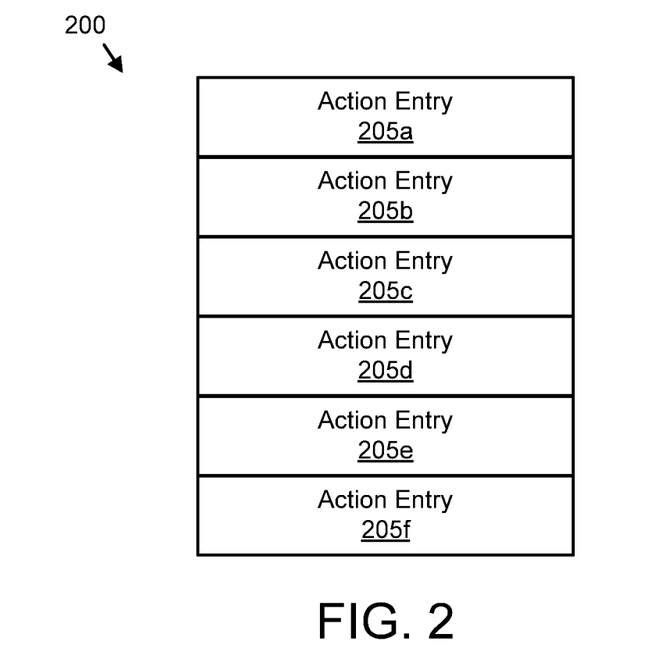
FIG. 2 is a schematic block diagram illustrating one embodiment of a data store.

FIG. 2 is a schematic block diagram illustrating one embodiment of a data store 200. The data store 200 may store the screenshot 125 and the time stamp indexed by the word segment 110 of FIG. 1. The description of the data store 200 refers to elements of FIG. 1, like numbers referring to like elements.

The data store 200 comprises a plurality of action entries 205. Each action entry 205 may include a word segment 110, at least one screenshot 125, and a time stamp as will be described hereafter in FIG. 3. In one embodiment, an action entry 205 is recorded after a specified capture interval. In a certain embodiment, the specified capture interval is a time interval. The specified capture interval may be in the range of 0.5 to 30 seconds. In a certain embodiment, the specified capture interval is in the range of 1 to 10 seconds. In an alternate embodiment, the specified capture interval is the number of characters from the input. For example, the specified capture interval may be a number of characters in the range of 3 to 50.

In one embodiment, the specified capture interval is a word count. The specified capture interval may be a word count in the range of 15 to 120 words. Alternatively, the specified capture interval may be an action count. The specified capture interval may be an action count in the range of 1 to 5 actions. An action may be a populating of a spreadsheet cell, a placement of the design elements, a connection of two or more design elements, a database entry, a browser navigation, or the like. For example, the specified capture interval may be a code count in the range of 1 to 5 lines of code written.

In one embodiment, the specified capture interval is concurrent with the specified input interval. In a certain embodiment, the specified capture interval may be modified in response to a command. In addition, the recording of action entries 205 may be turned off or turned on.

Figure 3:
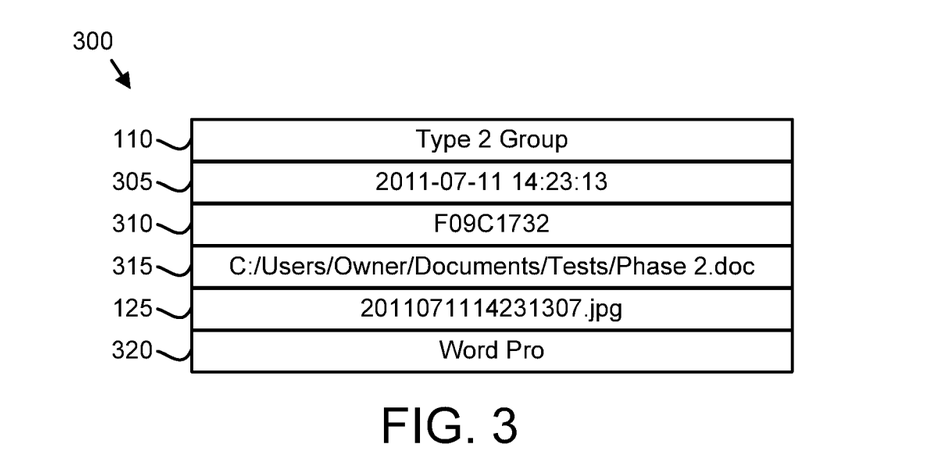
FIG. 3 is a schematic block diagram illustrating one embodiment of display content.

FIG. 3 is a schematic block diagram illustrating one embodiment of display content 300. The display content 300 may be embodied in an action entry 205 of FIG. 2. The description of the display content 300 refers to elements of FIGS. 1-2, like numbers referring to like elements. The display content 300 includes a word segment 110, a time stamp 305, a pointer 310, the path 315, the screenshot 125, and an application name 320.

The display content 300 may be organized as fixed length data fields, a flat file of delimiter separated values, a linked list, or the like. The time stamp 305 may include a year, a month, day, and the time. Alternatively, the time stamp 305 may be a number of elapsed seconds from a start time.

The pointer 310 may point to an active application window in communication with the input such as the application window 120. Alternatively, the pointer 310 may point to a data structure. For example, the pointer 310 may point to most recently received text in the application window 120. In one embodiment, the pointer is a MICROSOFT WINDOWS® Application Program Interface (API) compatible handle in the forms available as of the filing date of the present application.

The path 315 may specify a path to an active file being processed by the application window 120. Alternatively, the path 315 may specify the filename of the file being processed by the application window 120. In one embodiment, the path 315 is a relative path to the file. Alternatively, the path 315 may be an absolute path to the file.

The application name 320 may identify the application of the application window 120. For example, the application name 320 may identify a specific word processor such as LOTUS WORD PRO®. Alternatively, the application name 320 may specify a type of application such as a database application.

Figure 4:
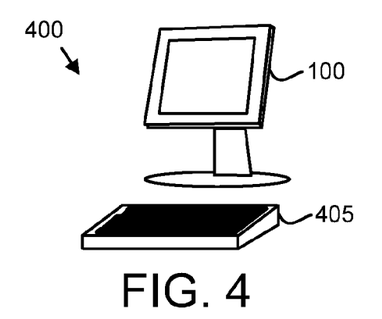
FIG. 4 is a perspective drawing illustrating one embodiment of a computer.

FIG. 4 is a perspective drawing illustrating one embodiment of a computer 400. The computer 400 includes a computer screen 100 and an input 405. The computer screen 100 may be the computer screen 100 of FIG. 1. The description of the computer 400 refers to elements of FIGS. 1-3, like numbers referring to like elements. The input 405 is depicted as a keyboard. However, embodiments may be practiced with other input devices. The input 405 may include a data stream communicated to the computer 400.

Figure 5:
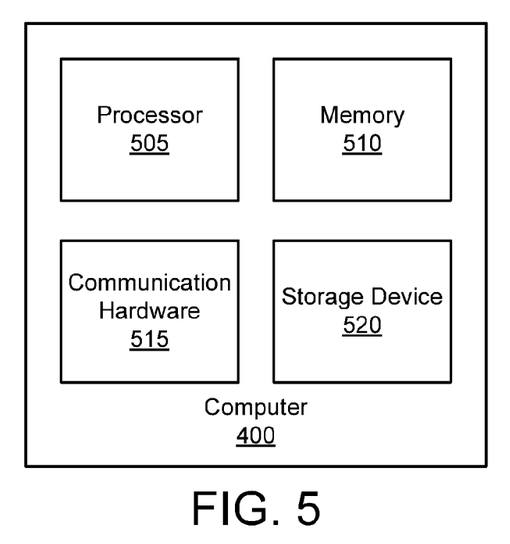
FIG. 5 is a schematic block diagram illustrating one embodiment of a computer.

FIG. 5 is a schematic block diagram illustrating one embodiment of a computer 400. The computer 400 may be the computer 400 of FIG. 4. The description of the computer 400 refers to elements of FIGS. 1-4, like numbers referring to like elements.

The memory 510 may store computer readable program code. The processor 505 may execute the computer readable program code. The computer 400 may communicate with the input 405 and the computer screen 100 through the communication hardware 515. The storage device 520 may also store the computer readable program code.

Figure 6:
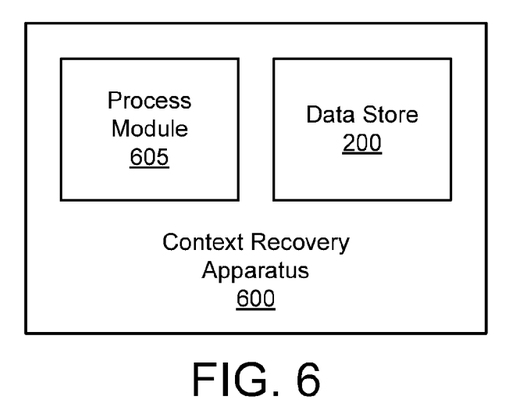
FIG. 6 is a schematic block diagram illustrating one embodiment of a context recovery apparatus.

FIG. 6 is a schematic block diagram illustrating one embodiment of a context recovery apparatus 600. The apparatus 600 may be embodied in the computer 400 of FIGS. 4-5. The description of the apparatus 600 refers to elements of FIGS. 1-5, like numbers referring to like elements. The apparatus includes a process module 605 and the data store 200. In one embodiment, the process module 605 and the data store 200 comprise computer readable program code stored on a computer readable medium such as the memory 510 and/or the storage device 520 and executed by the processor 505.

In one embodiment, the process module 605 parses the word segment 110 from the input 405. The process module 605 may also capture the screenshot 125 from the computer screen 100. In addition, the process module 605 may record the time stamp 305. The process module 605 may further append the display content 300 to the word segment 110 and store the display content 300 in the data store 200.

The data store 200 stores the display content 300 indexed to the word segment 110. In one embodiment, the display content 300 comprising at least one screen shot 125 captured as the word segment 110 is entered using the input 405 and the time stamp 305.

The process module 605 may search the data store 200 for the word segment 110. In addition, the process module 605 may present the display content 300 indexed to the word segment 110. In one embodiment, the process module 605 replays an action for the display content 300 as will be described hereafter.

Figure 7:
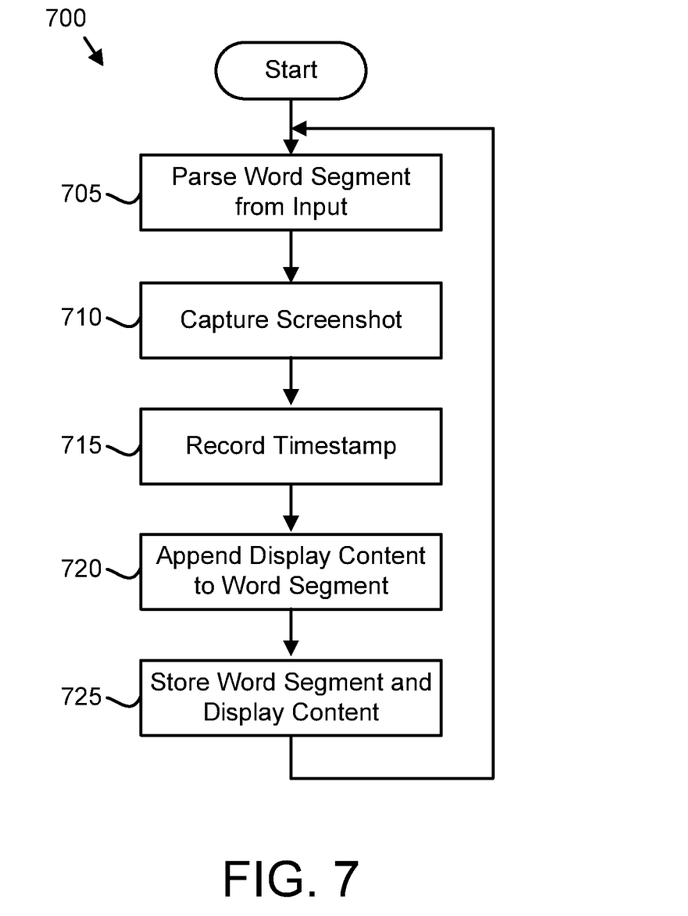
FIG. 7 is a schematic flow chart diagram illustrating one embodiment of a task context storage method.

FIG. 7 is a schematic flow chart diagram illustrating one embodiment of a task context storage method 700. The method 700 may perform the functions of the apparatus 600 FIG. 6. The description of the method 700 refers to elements of FIGS. 1-6, like numbers referring to like elements. In one embodiment, the method 700 is embodied in a computer program product comprising computer readable program code stored on a computer readable medium such as the memory 510 and/or the storage device 520 and executed by the processor 505.

The method 700 starts, and in one embodiment the process module 605 parses 705 the word segment 110 from the input 405. The process module 605 may parse 705 the word segment 110 after each specified input interval. Alternatively, the process module 605 may parse 705 the word segment 110 when a valid word is formed. The process module 605 may identify a valid word as characters separated by whitespaces and/or spaces.

In one embodiment, the process module 605 captures 710 the screenshot 125. In one embodiment, the screenshot 125 is captured 710 at the end of the specified input interval described for FIG. 1. Alternatively, the screenshot 125 is captured 710 at the end of the specified capture interval. In one embodiment, the process module records the pixels of the computer screen 100 in a buffer, compresses the pixel data using a compression algorithm, and stores the compress pixel data.

In one embodiment, the process module 605 only captures 710 screenshots 125 of actions that are or may be recorded in a file. For example, the process module 710 may capture 710 an entry of data into a spreadsheet cell but not capture a navigation within the spreadsheet.

The process module 605 may record 715 the time stamp 305. In one embodiment, the process module 605 records 715 the time stamp 305 by sampling the system clock such as a clock of the processor 505.

In one embodiment, the process module 605 appends 720 the display content 300 to the word segment 110. The appended display content 300 may include the word segment 110, the time stamp 305, the pointer 310, the path 315, the screenshot 125, and the application name 320 as shown in FIG. 3.

The process module 605 may store 725 the display content 300 appended with the word segment 110 in the data store 200. The stored display content 300 may include the word segment 110, the time stamp 305, the pointer 310, the path 315, the screenshot 125, and the application name 320. In one embodiment, the process module 605 stores 725 the display content 300 as an action entry 205. The method 700 may further loop to parse 705 another word segment 110 from the input 405.

The method 700 captures a task context. The task context is represented by the display content 300 which includes information describing what was being done, the application being used, the file being manipulated, and the time of the task. The task context may later be recovered by identifying the display content 300 for the task context.

Figure 8:
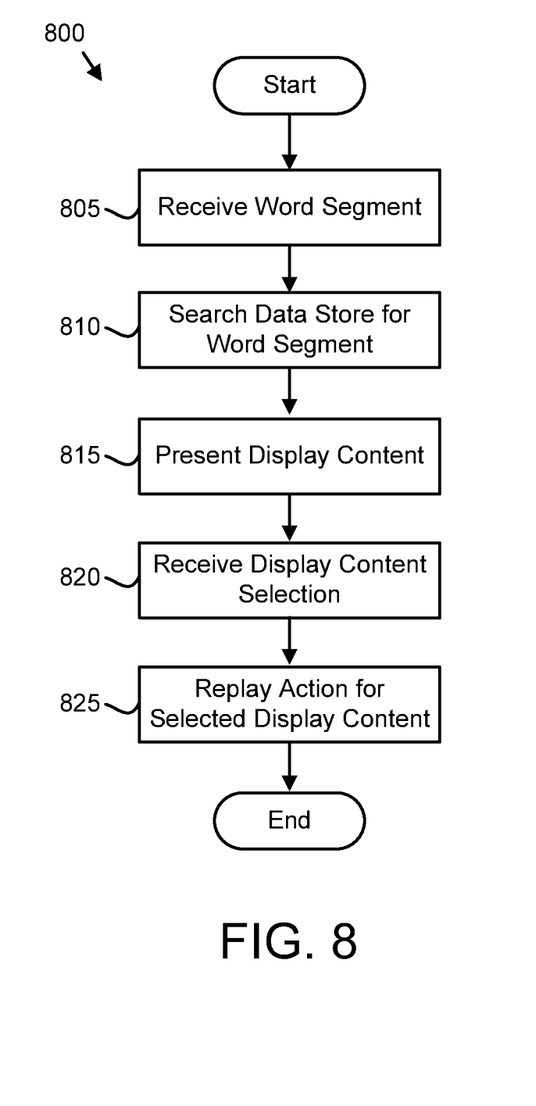
FIG. 8 is a schematic flow chart diagram illustrating one embodiment of a task context recovery method.

FIG. 8 is a schematic flow chart diagram illustrating one embodiment of a task context recovery method 800. The method 800 may perform the functions of the apparatus 600 FIG. 6. The description of the method 800 refers to elements of FIGS. 1-7, like numbers referring to like elements. In one embodiment, the method 800 is embodied in a computer program product comprising computer readable program code stored on a computer readable medium such as the memory 510 and/or the storage device 520 and executed by the processor 505.

The method 800 starts, and in one embodiment, the process module 605 receives 805 a word segment 110 as a search term. The process module 605 may receive 805 the word segment 110 from the input 405. In addition, the process module 605 may receive a start date, an end date, and an application name with the word segment 110.

The process module 605 searches 810 the data store 200 for words segments 110 stored in action entries 205 that match the search term. In one embodiment, the process module 605 searches 810 for words segments 110 that are complete matches to the search term. In an alternate embodiment, the process module 605 searches 810 for word segments 110 that are partial matches to the words segments 110 searched as will be described in more detail in the description of FIG. 9.

In one embodiment, the process module 605 presents 815 the display content 300 of the words segments 110 that match the search term. Presenting 815 the display content 300 may help a user identify a previous task context. The display content 300 may be presented as a list of one or more display content 300 from the action entries 205, as one or more screenshots 125, a calendar highlighting the dates of timestamps 305 for the display content 300 with words segments 110 matching the search term, or the like.

The process module 605 may receive 820 a selection of display content 300. The selection may be of the presented display content 300. In one embodiment, the selected display content 300 may be selected with a pointing device. The process module 605 may further replay 825 an action for the selected display content 300 and the method 800 ends.

In one embodiment, replaying 825 the action comprises displaying at least one screenshot 125. The screenshots 125 may be from a specified action time interval. In one embodiment, the specified action time interval ends concurrently with the specified input time interval. The specified action time interval may be in the range of 3 to 15 seconds. In a certain embodiment, the specified action time interval is in the range of five to 10 seconds. A plurality of screenshots 125 may be replayed 825 to illustrate the task context. Thus both the file of task and the task context may be identified. In a prophetic example, if a user was adding logic gates to control a memory refresh circuit during a previous session, the addition of the logic gates is shown to remind the user of the task.

In an alternate embodiment, replaying 825 the action comprises displaying the screenshots 125 from a plurality of display content 300 that immediately precedes and/or immediately follows the selected display content 300. In one embodiment, the action may be replayed 825 from a selected time.

By supporting identification of the display content 300 for the task context and replaying 825 an action of the task context, the method 800 allows finding a previous task including a file that was modified and recovering the context of the task by showing actions that were performed. Thus a user can quickly resume working where the previous session ended.

Figure 9:
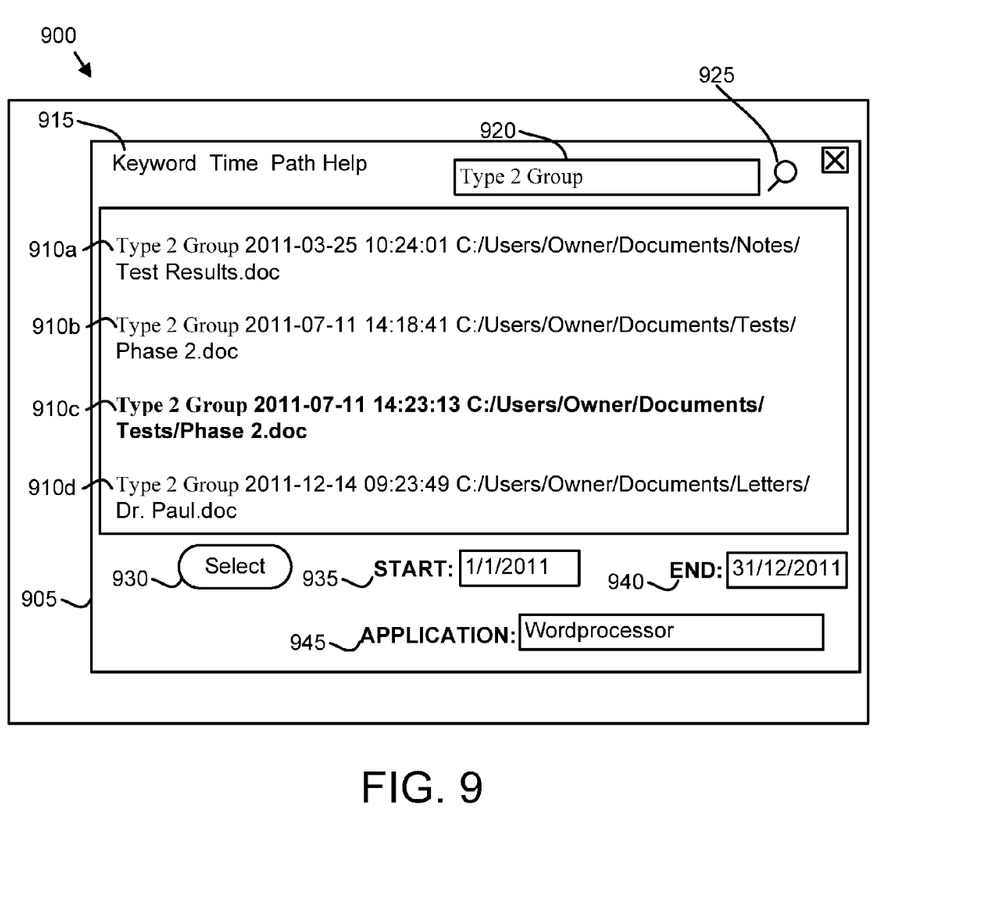
FIG. 9 is a drawing illustrating one embodiment of search results displayed on a computer screen.

FIG. 9 is a schematic block diagram illustrating one embodiment of search results 910 displayed on a computer screen 900. In the depicted example, the search results 910 may be presented 815 from a search 810 of the data store 200 to locate the text 115 of the file displayed in the application window 120 of FIG. 1. The description of the computer screen 900 refers to elements of FIGS. 1-8, like numbers referring to like elements.

A search results window 905 includes a search toolbar 915 with controls including a search field 920 and a search button 925. In one embodiment, a search term is entered into the search field 920 and a search 810 initiated by activating the search button 925. The search 810 may return a plurality of search results 910. In one embodiment, the search results 910 include each instance of an action entry 205 in the data store 200 with a word segment 110 that completely matches the search term entered into the search field 920.

Alternatively, the search 810 may return search results 910 that are a partial match to the search term entered into the search field 920. For example, the search results 910 may also include action entries 205 indexed with the word segments 110 "Type 2," "2 control," "Type control," "Type," "2," and "control." In a certain embodiment, the search results 910 may include action entries 205 with word segments 110 that include fragments of one or more words in the search term of the search field 920.

In one embodiment, the search results 910 include only action entries 205 with timestamps 305 that occur between a start date 935 and an end date 940. In one embodiment, the end date 940 is initially set to a current date and the start date 935 is initially set to a date selected from the group consisting of a date three months earlier, a date six months earlier, and a date 12 months earlier.

In one embodiment, the search results 910 include only action entries 205 with pointers 310 and/or application names 320 that match a specified application 945. For example, in the depicted embodiment, the search results 910 may only include action entries 205 with pointers 310 for a specified word processor. In one embodiment, search results 910, such as a third search result 910c, are selected by indicating the third search results 910c with a pointer and activating a select button 930.

Figure 10:
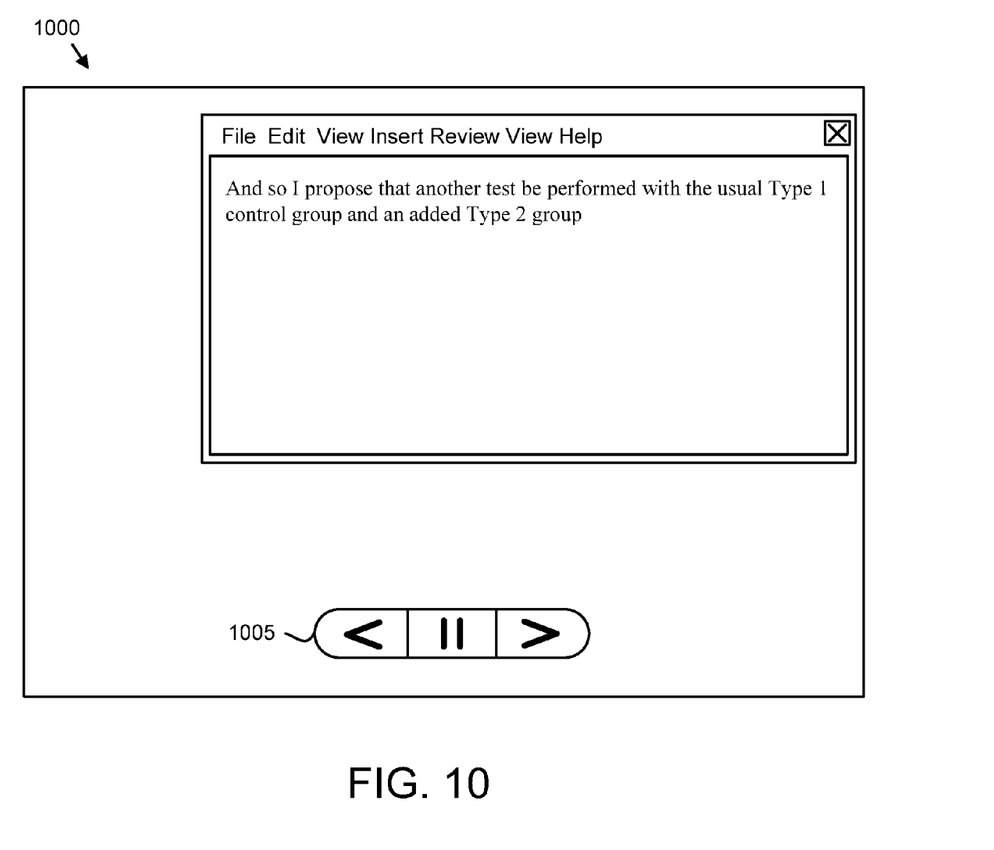
FIG. 10 is a drawing illustrating one embodiment of a screen shot replayed on a computer screen.

FIG. 10 is a schematic block diagram illustrating one embodiment of a replayed screen shot 1000. The replayed screen shot 1000 may be the replayed 825 action of FIG. 8. The description of the replayed screen shot 1000 refers to elements of FIGS. 1-9, like numbers referring to like elements.

In one embodiment, one or more screenshots 125 captured 710 during the specified capture interval are replayed 825. Replaying the action embodied in the screenshots 125 may be controlled by a play control, a pause control, a fast-forward control, and reversed control embodied in a control interface 1005. In one embodiment, selecting the open button 1010 may cause the process module 605 to open the file specified by the path 315 in the application window 120 and navigate to the text 115 containing the word segment 110.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for task context recovery, the method comprising:
   parsing, by use of a processor, a word segment from manual text input to an active application window;
   the word segment is a collection of significant words parsed from the text with relevancy values that exceed a relevancy threshold and that are entered within a specified input interval;
   capturing a plurality of display contents at a specified capture interval, each of the plurality of display contents comprising the word segment, a timestamp, a pointer to the active application window, a path to an active file, at least one screenshot of the active application window, and an active application name in response to parsing the word segment;
   storing the plurality of display contents indexed by the word segment in a data store;
   receiving a particular word segment as a search term;
   searching the data store for the particular word segment;
   presenting a list of display contents indexed to the particular word segment;
   receiving a display content selection of the list of display contents; and
   replaying an action for the selected display content, where the replaying the action comprises displaying the at least one screenshot of the display content for an action time interval, the at least one screen shot comprising at least one screenshot that immediately proceeds a first timestamp for the selected display content and at least one screen shot that immediately follows the first timestamp for the selected display content, in response to receiving the display content selection.

2. The method of claim 1, further comprising replaying the at least one screenshot from a selected time.

3. The method of claim 2, wherein the replaying of the at least one screenshot is controlled by a play control, a pause control, a fast forward control, and a reverse control.

4. A computer program product for task context recovery, the computer program product comprising:
   a non-transitory computer readable storage medium having computer readable program code stored therein, the computer readable program code configured to:
   parse a word segment from manual text input to an active application window;
   the word segment is a collection of significant words parsed from the text with relevancy values that exceed a relevancy threshold and that are entered within a specified input interval;
   capture a plurality of display contents at a specified capture interval, each of the plurality of display contents comprising the word segment, a timestamp, a pointer to the active application window, a path to an active file, at least one screenshot of the active application window, and an active application name in response to parsing the word segment;

store the plurality of display contents indexed by the word segment in a data store;
receive a particular word segment as a search term;
search the data store for the particular word segment;
present a list of display contents indexed to the particular word segment;
receive a display content selection of the list of display contents; and
replay an action for the selected display content, where the replaying the action comprises displaying the at least one screenshot of the display content for an action time Interval, the at least one screen shot comprising at least one screenshot that immediately proceeds a first timestamp for the selected display content and at least one screen shot that immediately follows the first timestamp for the selected display content, in response to receiving the display content selection.

5. The computer program product of claim 4, the computer readable program code further configured to replay the al least one screenshot from a selected time.

6. The computer program product of claim 5, wherein replaying the at least one screenshot is controlled by a play, a pause, a fast forward, and a reverse control.

7. An apparatus comprising:
a non-transitory computer readable storage medium storing computer readable program code executable by a processor;
parse a word segment from manual text input to an active application window;
the word segment is a collection of significant words parsed from the text with relevancy values that exceed a relevancy threshold and that are entered within a specified input interval;
capture a plurality of display contents at a specified capture interval, each of the plurality of display contents comprising the word segment, a timestamp, a pointer to the active application window, a path to an active file, at least one screenshot of the active application window, and an active application name in response to parsing the word segment;
store the plurality of display contents indexed by the word segment in a data store;
receive a particular word segment as a search term;
search the data store for the particular word segment;
present a list of display contents indexed to the particular word segment;
receive a display content selection of the list of display contents; and
replay an action for the selected display content, where the replaying the action comprises displaying the at least one screenshot of the display content for an action time interval, the at least one screen shot comprising at least one screenshot that immediately proceeds a first timestamp for the selected display content and at least one screen shot that immediately follows the first timestamp for the selected display content, in response to receiving the display content selection.

8. An article of manufacture comprising:
a non-transitory computer readable storage device having computer readable program code stored therein, the computer readable program code executable by a processor to perform:
parsing a word segment from manual text input to an active application window;
the word segment is a collection of significant words parsed from the text with relevancy values that exceed a relevancy threshold and that are entered within a specified input interval;
capturing a plurality of display contents at a specified capture interval, each of the plurality of display contents comprising the word segment, a timestamp, a pointer to the active application window, a path to an active file, at least one screenshot of the active application window, and an active application name in response to parsing the word segment;
storing the plurality of display contents indexed by the word segment in a data store;
receiving a particular word segment as a search term;
searching the data store for the particular word segment;
presenting a list of display contents indexed to the particular word segment;
receiving a display content selection of the list of display contents; and
replaying an action for the selected display content, where the replaying the action comprises displaying the at least one screenshot of the display content for an action time interval, the at least one screen shot comprising at least one screenshot that immediately proceeds a first timestamp for the selected display content and at least one screen shot that immediately follows the first timestamp for the selected display content, in response to receiving the display content selection.

\* \* \* \* \*